United States Patent [19]

Abe et al.

[11] Patent Number: 4,971,174
[45] Date of Patent: Nov. 20, 1990

[54] FOUR-WHEEL STEERING MOTOR VEHICLE

[75] Inventors: Masaru Abe; Takashi Kohata; Toshio Yahagi; Yoshihiro Iwagawa, all of Tochigi, Japan

[73] Assignee: Honda Giken Kogyo Kabushiki Kaisha, Tokyo, Japan

[21] Appl. No.: 325,214

[22] Filed: Mar. 17, 1989

[30] Foreign Application Priority Data

Mar. 17, 1988 [JP] Japan .................................. 63-64508

[51] Int. Cl.$^5$ .............................................. B62D 6/00
[52] U.S. Cl. ...................................... 180/140; 303/92
[58] Field of Search ........................... 180/140; 280/91; 303/92, 96, 100, 111

[56] References Cited

U.S. PATENT DOCUMENTS

| 4,687,214 | 8/1987 | Uno ........................................ 280/91 |
| 4,733,878 | 3/1988 | Kanazawa et al. .................... 280/91 |
| 4,740,002 | 4/1988 | Miyoshi ................................ 280/91 |
| 4,765,429 | 8/1988 | Sato ..................................... 303/111 |
| 4,784,444 | 11/1988 | McCann et al. .................... 303/111 |
| 4,840,243 | 6/1989 | Hirabayashi et al. ................ 303/92 |

Primary Examiner—Charles A. Marmor
Assistant Examiner—Anne M. Boehler
Attorney, Agent, or Firm—Irving M. Weiner; Joseph P. Carrier; Pamela S. Burt

[57] ABSTRACT

A four-wheel steering motor vehicle adapted to prevent a steering ratio of the rear wheels to the front wheels from varying at the time of sudden braking when the pressure of a brake liquid is reduced by an antilock brake unit. This vehicle includes a front wheel steering unit for steering the front wheels in accordance with angular movement of a steering wheel, a rear wheel steering unit for steering the rear wheels, steering control unit for determining a target steering angle of the respective rear wheels based on a vehicle speed and a front wheel steering angle and for controlling the rear wheel steering unit in such a manner that the rear wheel steering unit steers the rear wheel until a rear wheel steering angle reaches the target value, an antilock brake unit for calculating a slip coefficient of each wheel based on a sensed rotating speed of each wheel and for reducing the pressure of a brake liquid being supplied to a brake of the individual wheel when the slip coefficient of the wheel exceeds a predetermined value. The steering control unit controls the rear wheel steering unit so as to substantially prevent the rear wheel steering angle from varying when the pressure to the brake liquid is reduced by the antilock brake unit.

5 Claims, 4 Drawing Sheets

FOUR-WHEEL STEERING MOTOR VEHICLE

BACKGROUND OF THE INVENTION

1. Field of the Invention

The present invention relates to a four-wheel steering motor vehicle, and more particularly to such a motor vehicle furnished with an antilock brake unit.

2. Description of the Relevant Art

In four-wheel steering motor vehicles, steering performance of the vehicle has been improved by steering both front and rear wheels according to angular movement of a steering wheel. To this end, it is known to detect a vehicle speed, to determine a steering angle ratio and a steering phase of the rear wheels to the front wheels according to the detected vehicle speed, then to calculate a target steering angle of the rear wheels according to a front wheel steering angle and the steering angle ratio and steering phase determined above, and finally to steer the rear wheels until the rear wheels assume the target steering angle.

Meanwhile, many modern vehicles are equipped with an antilock brake unit in an effort to improve stability of the vehicle when suddenly braked. The antilock brake unit detects rotational speeds of the respective wheels and reduces the pressure of a brake liquid to be supplied to a brake of the individual wheel when the rotating speed of the wheel is suddenly reduced due to the braking operation, thereby automatically regulating a slip coefficient of the wheel to a proper range so as to prevent the wheel from being locked. This prior art is exemplified by Japanese Patent Laid-Open Pubilication No. 253564/87, which discloses a four-wheel steering motor vehicle equipped with the antilock brake unit.

However, in the four wheel steering vehicle of the type in which the steering angle ratio of the rear wheels to the front wheels is variable depending on the vehicle speed, since the rear wheel steering angle varies due to the change of the vehicle speed even when the front wheel steering angle is kept constant, the rear wheel steering angle would change when the vehicle speed is reduced due to braking at the time of cornering. This steering angle change of the rear wheels would cause the vehicle to make a change of orientation so that smooth and comfortable maneuvering of the vehicle is difficult to achieve.

SUMMARY OF THE INVENTION

It is therefore an object of the present invention to provide a four-wheel steering motor vehicle equipped with an antilock brake unit which is designed to prevent a substantial change of a rear wheel steering angle when a running speed of a vehicle is sharply reduced due to a sudden braking, guaranteeing an improved stability of steering operation.

According to the present invention, a four-wheel steering motor vehicle comprises a front wheel steering unit for steering front wheels in accordance with angular movement of a steering wheel, a rear wheel steering unit operatively connected to a motor for steering rear wheels, steering control means for determining a target steering angle of the rear wheels based on a vehicle speed and a front wheel steering angle and for controlling the rear wheel steering unit in such a manner that the rear wheel steering unit steers the rear wheels until a rear wheel steering angle reaches the target value, an antilock brake unit for calculating a slip coefficient of each of the wheels based on a rotating speed of each wheel and for reducing the pressure of a brake liquid being supplied to a brake of the wheel when the slip coefficient of the wheel exceeds a predetermined value. The steering control means is operable to control the rear wheel steering unit so as to prevent the rear wheel steering angle from varying when the pressure of the brake liquid is reduced by the antilock brake unit.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
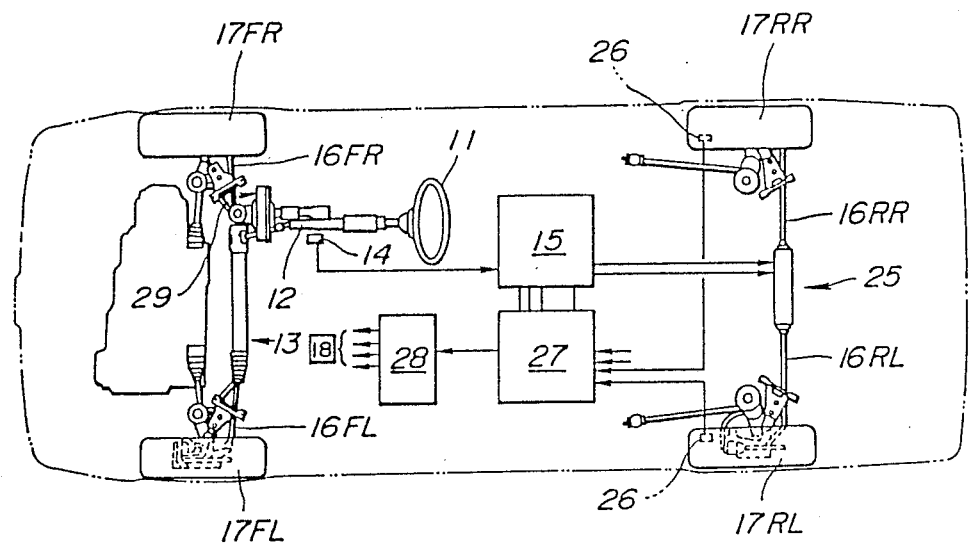
FIG. 1 is a schematic top view, with parts omitted, of a four-wheel steering motor vehicle embodying the present invention.

The principles of the present invention are particularly useful when embodied in a four-wheel steering motor vehicle in which an antilock brake unit is incorporated, the vehicle being generally illustrated in FIG. 1.

As shown in FIG. 1, a steering wheel 11 is connected to a front wheel steering gear mechanism 13 of the rack-and-pinion type via a steering shaft 12. The steering gear mechanism 13 is comprised of a pinion rotatable as a unit with the steering shaft 12, and a rack shaft having a rack meshing with the pinion and extending transversely of the vehicle. The rack shaft is connected at opposite ends to respective knuckle arms of left and right front wheels 17FL, 17FR via steering linkages including a pair of tie rods 16FL, 16FR. A steering angle sensor 14 for the front wheels 17FL, 17FR includes an encoder for detecting a rotational angle of the steering shaft 12 and outputs a detection signal, indicative of the front steering angle, to a steering control unit 15.

A rear wheel steering unit is mounted on a rear portion of the vehicle and includes a rear wheel steering gear mechanism 25 and a motor (not shown) for driving the rear wheel steering gear mechanism 25. The rear wheel steering gear mechanism 25, like the front wheel steering gear mechanism 13, is a rack-and-pinion type. This motor is controlled by the steering control unit 15. The steering gear mechanism 25 is comprised of a pinion connected to an output shaft of the motor, and a rack mechanism having a rack meshing with the pinion. The rack shaft is connected at opposite ends to respective knuckle arms of left and right rear wheels 17RL, 17RR via the respective steering linkages. A steering angle sensor (not shown) for the rear wheel is, for example, mounted on the rack shaft of the steering gear mechanism 25 for detecting a length of axial movement of the rack shaft to thereby output a signal representative of the rear wheel steering angle.

Figure 2:
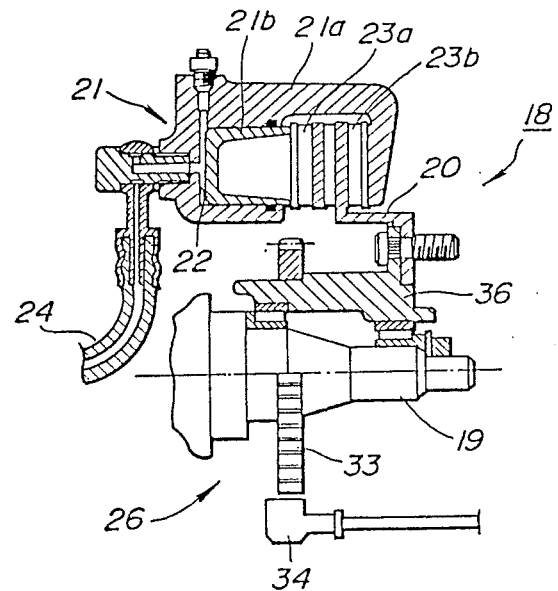
FIG. 2 is an enlarged detail cross-sectional view of a portion of FIG. 1.

Furnished with each of the front and rear wheels 17FL, 17FR, 17RL, 17RR are a disk brake 18 and a sensor 26 for detecting a rotating speed of the wheel, as shown in FIG. 2. A hub 36, to which the individual wheel (not shown) is attached, is rotatably supported on a spindle 19 fixedly secured to the knuckle arm.

The rotating speed sensor 26 is composed of a toothed ring plate 33 fixedly secured to the hub 36, and an electromagnetic pick-up 34 for detecting the rotational speed of the ring plate 33; the output signal of the pick-up 34 is inputted to an antilock brake control unit 27.

The disk brake 18 is comprised of a brake disk 20 integrally mounted on the hub 36, and a caliper 21 for holding the braking disk 20 from opposite sides. The caliper 21 includes a body 21a in which a piston 21b is slidably fitted to define an actuation chamber 22. A pair of pads 23a, 23b is mounted on the respective confronting surfaces of the body 21a and the piston 21b to sandwich the braking disk 20. The actuation chamber 22 of the caliper 21 communicates with an antilock brake unit 28 via a hose 24.

A master cylinder 29 produces a pressure in a brake liquid through a driver's actuation of a brake pedal, and this brake-liquid pressure is impressed to the actuation chamber 22 of the disk brake 18 after having been regulated by the antilock brake unit 28. The antilock brake unit 28, as is well known in the art, includes a pump for imparting a pressure to the brake liquid, an accumulator for storing the brake liquid of high pressure produced by the pump, a solenoid valve connected to the antilock brake control unit 27, and a modulator valve for regulating the brake-liquid pressure in response to the actuation of the solenoid valve. The operation of the antilock brake unit 28 is controlled by the antilock brake control unit 27.

The steering control unit 15 and the antilock brake control unit 27 are equipped with a microcomputer or the like and are operatively interconnected each other.

The antilock brake control unit 27 calculates a running speed of the vehicle and a slip coefficient (ratio of the difference between a circumferential speed of the tire and the vehicle speed to the circumferential speed of the tire) of each wheel 17FR, 17FL, 17RR, 17FL based on a detection signal from the rotating speed sensor 26 for each wheel. When the slip coefficient of one of the four wheels is about to exceed a predetermined value to thereby lock the wheel, the antilock brake control unit 27 controls the antilock brake unit 28 to reduce the brake-liquid pressure of the wheel. Accordingly, the braking force of the particular wheel having an excessively large slip coefficient is reduced so as not to lock the wheel, thereby causing an improved degree of braking performance. At that time, the antilock brake control unit 27 outputs a control signal to the antilock brake unit 28 and also outputs the same control signal to the steering control unit 15.

Figure 3:
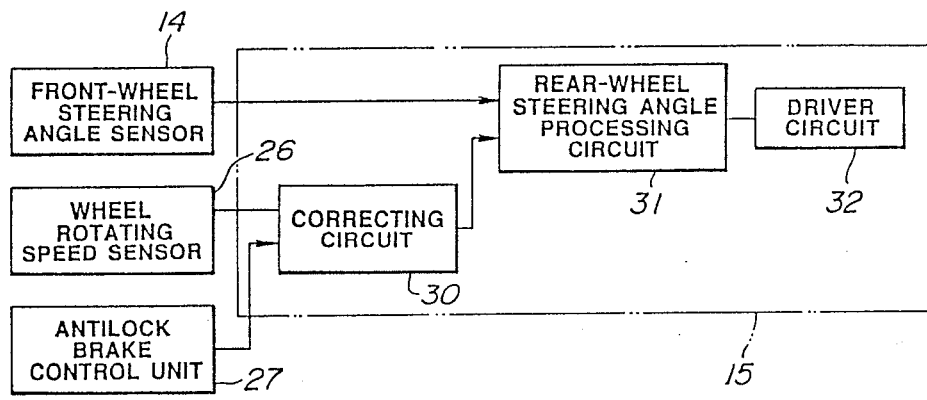
FIG. 3 is a block diagram showing a control system of the present invention.

As shown in FIG. 3, the steering control unit 15 includes a correcting circuit 30, a rear wheel steering angle processing circuit 31, and a driver circuit 32. To the correcting circuit 30, signals are inputted respectively from the rotating speed sensor 26 and the antilock brake control unit 27. The correcting circuit 30 calculates a running speed of the vehicle based on the signal from the rotating speed sensor 26, and corrects a previously calculated value of vehicle speed, upon receipt of the signal from the antilock brake control unit 27, to issue an output signal to the rear wheel steering angle processing circuit 31. This correcting is such that the thus value of vehicle speed can be substantially prevented from changing when the vehicle is suddenly braked, at which time the antilock brake control unit 27 outputs the control signals.

Figure 4:
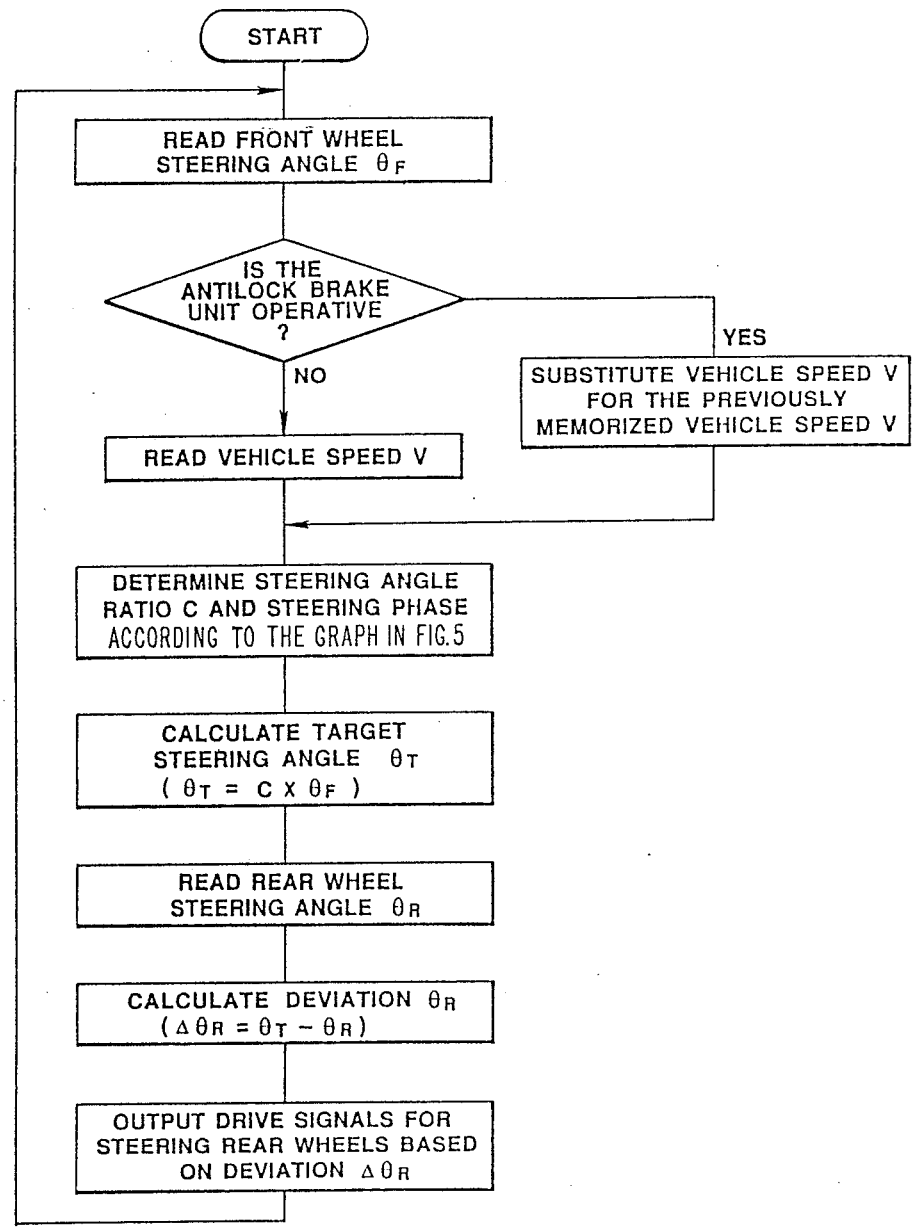
FIG. 4 is a flow chart of a control sequence of the control system shown in FIG. 3.

To the rear wheel steering angle processing circuit 31, signals are inputted from the front-wheel steering angle sensor 14 and the correcting circuit 30. The rear wheel steering angle processing circuit 31 determines a steering angle ratio and a steering phase of the rear wheels to the front wheels, according to the characteristics of FIG. 5, based on the vehicle speed corrected by the correcting circuit 30, and calculates a target steering angle of the rear wheel from a front steering angle inputted from the front-wheel steering angle sensor 14 and from the determined steering angle ratio and the steering phase. The driver circuit 32 drives the motor for the rear wheel steering unit 25 based on the signal from the rear-wheel steering angle processing circuit 31, and steers the rear wheels 17RL, 17RR until the latter assume the target steering angle. At that time, the rear steering angle is controlled in such a manner that the deviation between the target steering angle for the rear wheels and the rear wheel's actual steering angle detected by the above discussed rear-wheel steering angle sensor is minimal. The flow chart of a control sequence of the control system described above is shown in FIG. 4.

Figure 5:
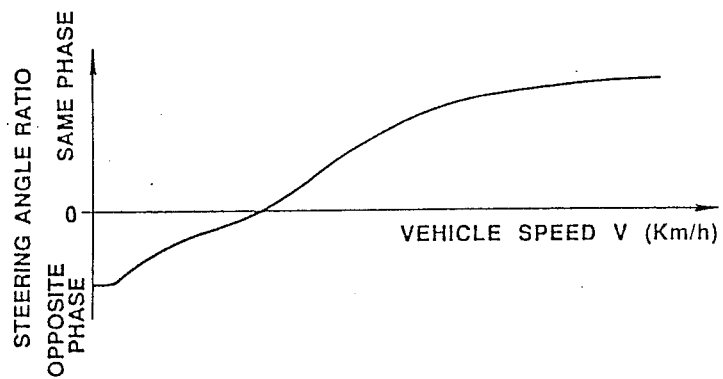
FIG. 5 is a graph showing the steering characteristics of rear wheels.

The on-map searching, which determines the steering angle ratio and the steering phase of the rear wheels to the front wheels, are carried out based on the characteristic graph of FIG. 5. In the high-running-speed zone, the rear wheels 17RL, 17RR are steered in the same phase with respect to the front wheels 17FL, 17FR so that a good turning stability can be achieved. In the low-running speed zone the rear wheels 17RL, 17RR are steered in the opposite phase with respect to the front wheels 17FL, 17FR so that the front end of the vehicle can be turned or oriented along a reduced radius of curvature. In this case, if the vehicle speed value (to be address data for a steering control unit for the rear wheel steering gear mechanism) is not corrected, the rear wheel steering angle would vary correspondingly to the reduction of the steering ratio as the vehicle speed V is lowered with vehicle braking, even when the front wheels' steering angle is kept constant, as is readily understood from FIG. 5. To the contrary, according to the present invention, when the running speed of the vehicle is sharply reduced as the vehicle is suddenly braked, the correcting circuit 30 substantially prevents the vehicle speed value V from varying so that the steering ratio can be prevented from varying. Consequently, the steering angle of the rear wheel is substantially prevented from changing when the vehicle is suddenly braked, thus causing an improved degree of maneuvering performance.

In the illustrated embodiment, since the vehicle speed is calculated based on the signal from the rotating speed sensor of the antilock brake unit, it is possible to share, with the antilock brake unit, the arithmetic part of the circuit which determines the vehicle speed from the rotating speed of the individual wheel, thus minimizing the cost of production.

Further, in the case where the friction factor $\mu$ of the road surface is low, since the antilock brake unit operates at a low rate of reducing the vehicle speed, the change of the rear wheel's steering angle can be prevented even at a high vehicle speed, thus guaranteeing good running stability.

Figure 6:
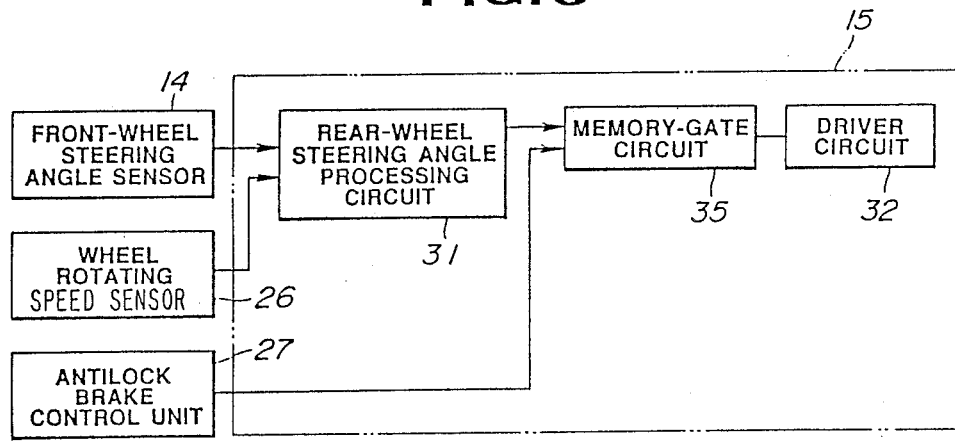
FIG. 6 is a block diagram similar to FIG. 3, but showing another embodiment of the present invention.

In the foregoing embodiment, the change of the rear wheel steering angle is substantially prevented by regulating the change of the vehicle speed value which is used as the address data in the on-map searching to determine the steering angle ratio. Alternatively, as shown in FIG. 6, the steering control unit 15 may include a memory gate circuit 35 for memorizing the target steering angle of the rear wheels outputted from the rear wheel steering angle processing circiut 31 and for outputting the memorized target steering angle to the driver circuit 32 while the actuation signal is being outputted from the antilock brake control unit 27.

Figure 7:
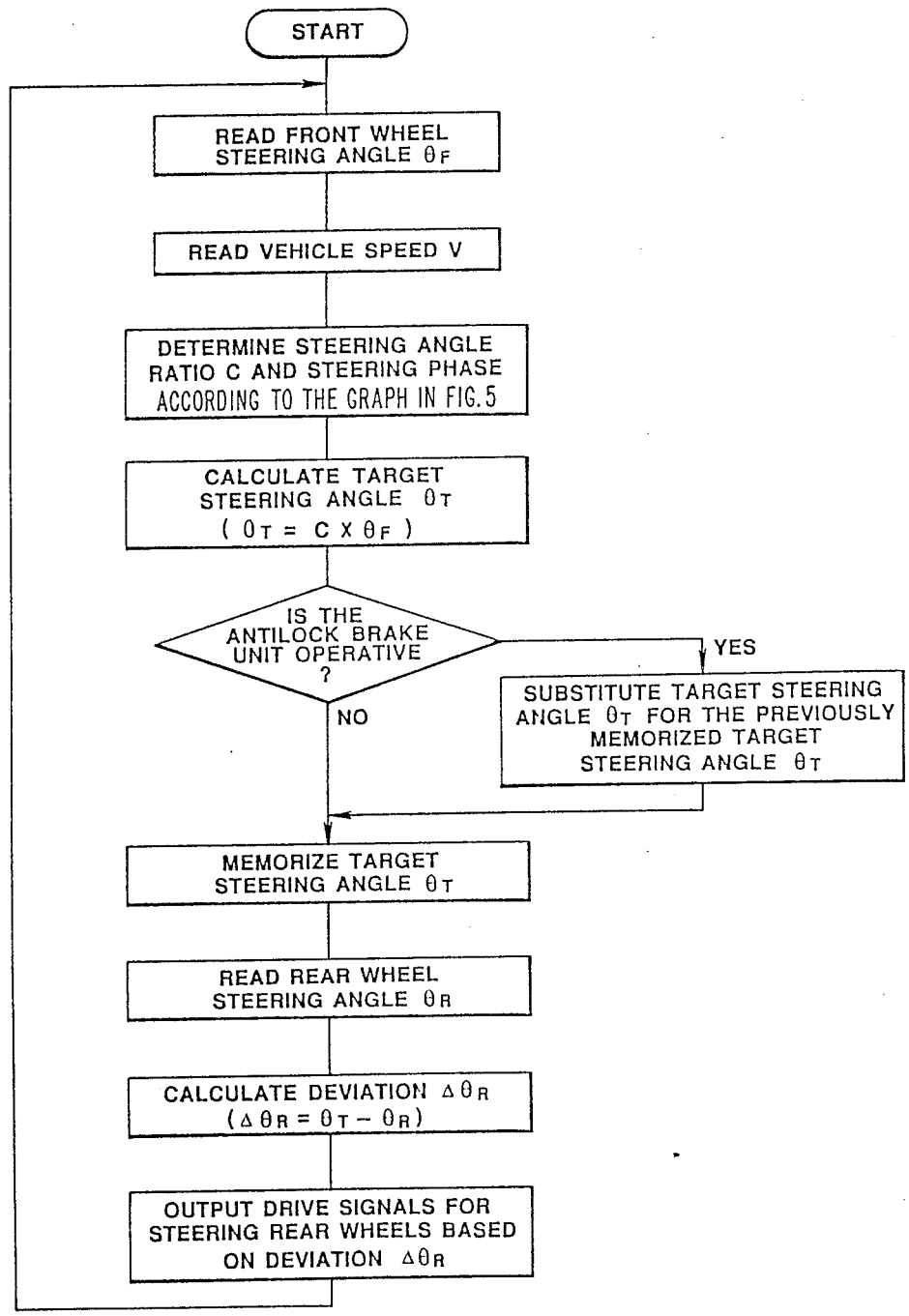
FIG. 7 is a flow chart of a control sequence of the control system shown in FIG. 6.

The flow chart of a control sequence of the control system described above in relation to FIG. 6 is shown in FIG. 7.

With the foregoing four wheel steering motor vehicle, since the rear wheel steering angle can be substantially prevented from changing even if the running speed of the vehicle is sharply lowered when the vehicle is suddenly braked, improved stability of steering operation and hence excellent maneuvering performance can be achieved.

Although there have been described what are at present considered to be the preferred embodiments of the invention, it will be understood that the invention may be embodied in other specific forms without departing from the essential characteristics thereof. The present embodiments are, therefore, to be considered in all respects as illustrative, and not restrictive. The scope of the invention is indicated by the appended claims rather than by the foregoing description.

What is claimed is:

1. A four-wheel steering motor vehicle, comprising:
   (a) a front wheel steering unit for steering front wheels in accordance with angular movement of a steering wheel;
   (b) a rear wheel steering unit for steering rear wheels;
   (c) steering control means for determining a target steering angle of the rear wheels based on a vehicle speed and a front wheel steering angle and for controlling said rear wheel steering unit in such a manner that said rear wheel steering unit steers the rear wheels until a rear wheel steering angle reaches said target value;
   (d) an antilock brake unit for calculating a slip coefficient of each of the wheels based on a rotating speed of each said wheel and for reducing the pressure of a brake liquid being applied to a brake of the wheel when the slip coefficient of the wheel exceeds a predetermined value; and
   (e) said steering control means being operable to control said rear wheel steering unit so as to substantially prevent the rear wheel steering angle from varying in response to a change of the vehicle speed, when said antilock brake unit is operative.

2. A four-wheel steering motor vehicle according to claim 1, wherein said steering control means is adapted to determine a steering phase and a steering ratio of the rear wheels with respect to the front wheels based on the vehicle speed for calculating said target steering angle of the rear wheels, said steering control means being adapted to substantially prevent the steering ratio from varying when the antilock brake unit is operative.

3. A four-wheel steering motor vehicle according to claim 1, wherein said steering control means includes a driver circuit for driving a motor operatively connected with said rear wheel steering unit, a rear wheel steering angle processing circuit for determining a target steering angle of the rear wheels to output an operative signal to said driver circuit, and a correcting circuit for correcting a value of the vehicle speed so as to substantially prevent the same from varying and for issuing an output signal to said rear wheel steering processing circuit.

4. A four-wheel steering motor vehicle according to claim 1, wherein said antilock brake unit is provided with a sensor for detecting a rotating speed of the wheels, said steering control means being adapted to calculate the vehicle speed based on an output signal from said sensor.

5. A four-wheel steering motor vehicle according to claim 1, wherein said steering control means includes a driver circuit for driving a motor operatively connected with said rear wheel steering unit, a rear wheel steering angle processing circuit for determining the target steering angle of the rear wheels to output an operative signal to said driver circuit, and a memory gate circuit gate for memorizing said target steering angle of the rear wheels outputted from said rear wheel steering angle processing circuit, said memory gate circuit being adapted to output said memorized target steering angle of the rear wheels to said driver circuit when said antilock brake unit is operative.

* * * * *

UNITED STATES PATENT AND TRADEMARK OFFICE
CERTIFICATE OF CORRECTION

PATENT NO. : 4,971,174
DATED : November 20, 1990
INVENTOR(S) : Masaru Abe et al.

It is certified that error appears in the above-identified patent and that said Letters Patent is hereby corrected as shown below:

Column 1, line 32, change "Pubilication" to --Publication--.

Column 3, line 42, after "interconnected" insert --to--.

Column 4, line 39, change "low-running speed" to --low-running-speed--;
        line 46, change "correspondingly" to --corresponding--.

Signed and Sealed this

Twelfth Day of May, 1992

*Attest:*

DOUGLAS B. COMER

*Attesting Officer*      *Acting Commissioner of Patents and Trademarks*